Sept. 10, 1940.  A. J. N. DUCLOS  2,214,016
METHOD OF AND APPARATUS FOR TREATING MOVING MATTER
Filed Nov. 7, 1936
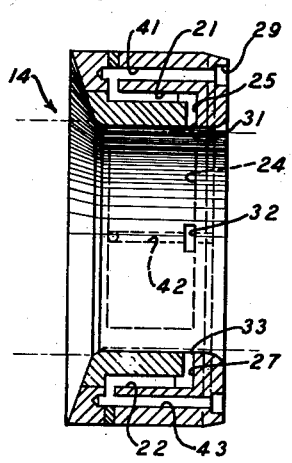
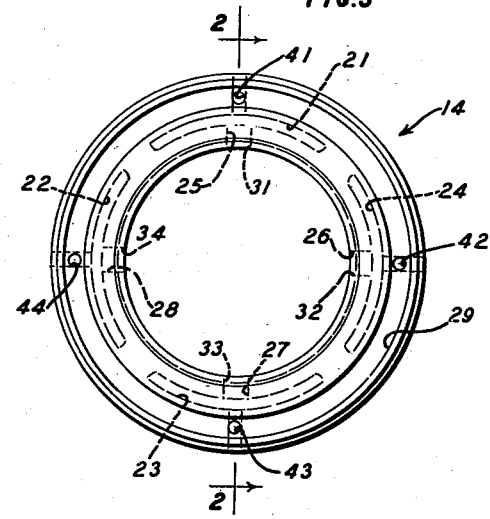
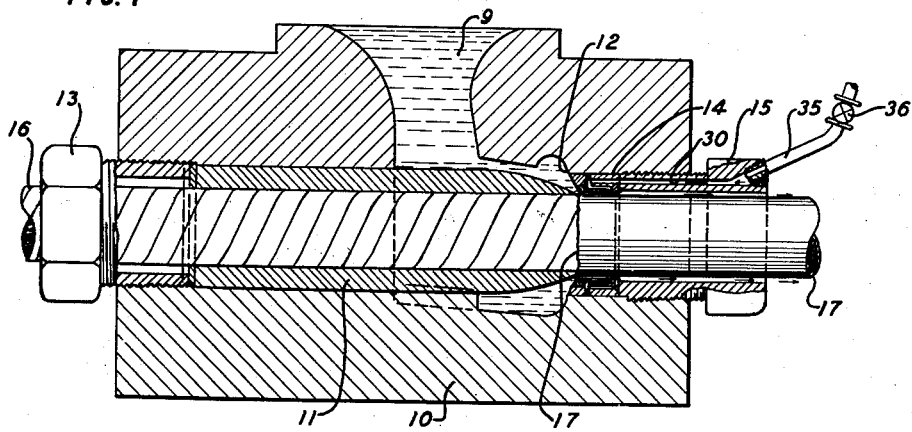
INVENTOR
A.J.N. DUCLOS
BY
E.R. Nowlan
ATTORNEY Patented Sept. 10, 1940

2,214,016

UNITED STATES PATENT OFFICE 2,214,016

METHOD OF AND APPARATUS FOR TREATING MOVING MATTER

Aeneas J. N. Duclos, South Orange, N. J., assignor to Western Electric Company, Incorporated, New York, N. Y., a corporation of New York Application November 7, 1936, Serial No. 109,711

12 Claims. (Cl. 207—2)

This invention relates to a method of and apparatus for treating moving matter and more particularly to a method of and apparatus for extruding metals.

In the art of extruding metals especially as empty tubes or as concentric sheaths on elongated cores, e. g. in the manufacture of cables sheathed with lead or lead alloy, a principal problem is often to control the formation of the tubular extruded mass to maintain a predetermined thickness at various points on successive transverse peripheries, e. g., to maintain equal thickness all around a cable sheath.

An object of the present invention is to provide a method of and apparatus for extruding tubular articles of metal which shall be self-controlling with respect to the relative thickness of several simultaneously extruded portions.

One embodiment of the invention contemplates an improvement on and an addition to the invention disclosed and claimed in U. S. Patent No. 2,002,690, issued May 28, 1935, on an application by Herbert F. Carter, which improvement presents a method of and apparatus for using a fluid cooling agent, such as steam, circulating within the body of an extrusion die and escaping therefrom between the wall of the outlet of the die and the exterior surface of the extruded product, changes in the direction of travel of the product being applied to control differentially the flow of the cooling fluid through and from different portions of the die.

Other objects and features of the invention will clearly appear from the following detailed description of one embodiment thereof taken in connection with the accompanying drawing showing an apparatus constructed in accordance with the invention for carrying on the method of the invention, in which like reference numerals are applied to identical parts in the several figures and in which Fig. 1 is a vertical central section of a portion of an extrusion apparatus;

Fig. 2 is an enlarged detached view in vertical central section of the die on the line 2—2 of Fig. 3; and Fig. 3 is an enlarged detached view of the die in end elevation.

In the embodiment herein disclosed, a core tube 11 is supported within a hollow die block 10, the two being arranged to provide an annular passage 12 for the material 9 to be extruded. The core tube is locked in position by a nut 13. The passage 12 tapers down toward its outlet and there communicates with the central aperture of an extrusion die 14, held in position in the block 10 by a locking sleeve nut 15.

A cable core 16 is advanced through the core tube 11, die 14 and sleeve nut 15 by any suitable means not shown, if necessary in addition to the propelling effect of the extrusion process itself, and a sheath 17 of the material 19 is extruded over the core by pressure exerted on the material 9 by any suitable means not shown, as the core passes through the die 14.

In passing through the die, the outer surface of the extruded sheath as it cools and hardens follows approximately some such form as is indicated by the dotted lines in Fig. 2, filling the entire cross-section of the central extrusion aperture at the inlet thereof and shrinking away from the cylindrical wall of the apertrure as it progresses toward the outlet, thus leaving a toroidal gap between the inner wall of the die and the outer surface of the sheath.

The die 14 and sleeve nut 15 are so constructed that the outer surface of the sheath from the point where it shrinks away from the inner wall of the die until the sheath leaves the nut is enveloped in a current of steam at about 215° F. and having a velocity through the central aperture of the die of about 1000 feet per second or more.

To this end the die may be constructed with four internal arcuate chambers 21, 22, 23 and 24, distinct from and independent of each other, each covering a substantial portion of one quadrant of the die to control the temperature of that portion of the die. Each chamber is connected by a short radial passage 25, 26, 27 or 28 respectively with an outlet port 31, 32, 33 or 34 respectively in the inner surface of the die. Each chamber is also connected by a passage 41, 42, 43 or 44 respectively to a common circumferential groove or channel 29 formed in the peripheral face of the outer end of the die.

A passage 30 in the annular body of the sleeve nut 15 communicates at its inner end with the channel 29 and at its outer end with a pipe 35 connected to any appropriate supply of steam at preferably 50 to 100 lbs. pressure which is admitted under control of a valve 36 or other suitable device.

In operation the material 9 in the reservoir, if the customary lead antimony alloy, at the point where it begins to form the sheath on the core at the inlet of the die has a temperature of the order of 375°–400° F. Steam supplied at 215° F. is therefore a cooling agent with respect to both the die and the sheath, and when supplied at a rate to produce a steam velocity through the die of about 1000 feet per second or more, is found to reduce the surface temperature of the sheath at its exit from the die to a value of the order of 210°-220° F. At the same time the die is held at a temperature of the order of 250° F. or less.

If for any reason the material extruded becomes slightly cooler and stiffer on one aspect of the core than on the opposite, say for illustration if it is a little cooler or stiffer at the bottom of the inlet of the die than at the top, the extrusion is slowed down or drags correspondingly on the side where the material is stiffer, in this case at the bottom. Two results follow: the sheath grows thinner at the bottom as the softer material at the top extrudes more plentifully, and the excessive extrusion at the top pushes the core and with it the whole sheathed core laterally downwardly toward the stiffer side. Thus the production of non-concentric or unequally thick extrusion product will move the product passing through the die laterally toward that aspect thereof on which the extruded material is thin.

With a die constructed in accordance with the present invention as disclosed, this motion of the product will tend to close the steam outlet port on the too cool side thus shutting off the flow of steam both through the corresponding cooling chamber of the die and along the corresponding aspect of the product. In the illustrative case, the downward diversion of the moving product will tend to close the port 33 thus diminishing or even stopping the flow of steam both through the chamber 23 and along the under aspect of the product. At the same time the steam flow and hence the cooling effect in the diametrically opposite chamber 21 and along the opposite or upper aspect of the product is enhanced.

Temperature equality circumferentially of the portion of product being formed is thus automatically restored, the die and product being mutually self-controlling in the process.

Although as herein disclosed the invention is shown as applied to the extrusion of lead alloy sheathing over a cable core it is not limited to such application only. The embodiment herein disclosed is illustrative only and may be departed from and modified in many ways without departing from the spirit and scope of the invention as pointed out in and limited solely by the appended claims.

What is claimed is:

1. In an extrusion press, an extrusion die having the extrusion aperture thereof substantially cylindrical and without abrupt changes in diameter, a plurality of chambers within the body of the die about the aperture to receive a current of temperature controlling fluid, and a passageway from each chamber to the aperture, in combination with means to supply a current of temperature controlling fluid to the chambers of the die, the parts being so disposed and arranged that fluid flowing from the chambers to the aperture will flow thence as a moving envelope about the product being extruded through the die and that the relative flow of fluid through the several chambers of the die will be varied by lateral motion of the product within the die.

2. In an extrusion press an annular extrusion die formed to have an extrusion aperture, a plurality of chambers annularly disposed about the aperture and within the body of the die and a radial passageway from each chamber to the aperture, means to extrude a material through the die, and means to supply a current of temperature controlling fluid to the chambers of the die, through the passageways and over the material in the die, lateral motion of a portion of the material within the die closing the passageway adjacent thereto to an extent dependent upon the lateral movement of the material.

3. In an extrusion press an annular extrusion die formed to have an extrusion aperture, a plurality of chambers annularly disposed about the aperture and within the body of the die and a radial passageway from each chamber to the aperture, means to extrude a material through the die, and means to supply a current of temperature controlling fluid to the chambers of the die, through the passageways and over the material in the die, lateral motion of a portion of the material within the die closing the passageway adjacent thereto to an extent dependent upon the lateral movement of the material to vary the flow of the current of fluid through the several chambers of the die.

4. In an extrusion press an annular extrusion die formed to have an extrusion aperture, a plurality of chambers annularly disposed about the aperture and within the body of the die and a radial passageway from each chamber to the aperture, means to extrude a material through the die, and means to supply a current of temperature controlling fluid to the chambers of the die, through the passageways and over the material in the die, lateral motion of a portion of the material within the die closing the passageway adjacent thereto to an extent dependent upon the lateral movement of the material to vary the flow of the current of fluid through the several chambers and over the material in the die.

5. In an extrusion press an annular extrusion die formed to have an extrusion aperture, a plurality of chambers annularly disposed about the aperture and within the body of the die and a radial passageway from each chamber to the aperture, means to extrude a material through the die, and means to supply a current of temperature controlling fluid to the chambers of the die, through the passageways and over the material in the die, lateral motion of a portion of the material within the die closing the passageway adjacent thereto to an extent dependent upon the lateral movement of the material to vary the flow of the current of fluid through the several chambers and over the material in the die to affect the lateral movement of the material.

6. In an extrusion press an annular extrusion die formed to have an extrusion aperture, a plurality of chambers annularly disposed about the aperture and within the body of the die and a radial passageway from each chamber to the aperture, means to extrude a material through the die, and means to supply a current of temperature controlling fluid to the chambers of the die, through the passageways and over the material in the die, lateral motion of a portion of the material within the die closing the passageway adjacent thereto to an extent dependent upon the lateral movement of the material to decrease the flow of the current of fluid in the adjacent chamber.

7. In an extrusion press an annular extrusion die formed to have an extrusion aperture, a plurality of chambers annularly disposed about the aperture and within the body of the die and a radial passageway from each chamber to the aperture, means to extrude material through the die, and means to supply a current of temperature controlling fluid to the chambers of the die, through the passageways and over the material in the die, lateral motion of a portion of the material within the die closing the passageway adjacent thereto to an extent dependent upon the lateral movement of the material to decrease the flow of the current of fluid in the adjacent chamber and increase the flow of the current of fluid in the other chambers.

8. In an extrusion press an annular extrusion die formed to have an extrusion aperture, a plurality of chambers annularly disposed about the aperture and within the body of the die and a radial passageway from each chamber to the aperture, means to extrude a material through the die, and means to supply a current of temperature controlling fluid to the chambers of the die, through the passageways and over the material in the die, lateral motion of a portion of the material within the die closing the passageway adjacent thereto to an extent dependent upon the lateral movement of the material to decrease the flow of the current of fluid over the said portion of the material in the die.

9. In an extrusion press an annular extrusion die formed to have an extrusion aperture, a plurality of chambers annularly disposed about the aperture and within the body of the die and a radial passageway from each chamber to the aperture, means to extrude a material through the die, and means to supply a current of temperature controlling fluid to the chambers of the die, through the passageways and over the material in the die, lateral motion of a portion of the material within the die closing the passageway adjacent thereto to an extent dependent upon the lateral movement of the material to decrease the flow of the current of fluid over the said portion of the material in the die and increase the flow of the current of fluid over the material in the die adjacent the other passageways.

10. A method of treating material, which comprises extruding through a die material heated to a temperature sufficient to soften the material, variations in the temperature of portions of the material passing through the die causing variations in the speed of movement of the portions through the die, directing fluid currents to the portions of the material to cool the material, and utilizing variations in the speed of movement of the portions of the material to cause variations in the flow of the fluid currents to cause even movement of all portions of the material through the die.

11. A method of treating material, which comprises extruding through a die a material heated to a temperature sufficient to soften the material, directing fluid currents to portions of the material to cool the material, the cooling of one portion of the material more rapidly than the other portions causing lateral movement of the cooler portion, and utilizing lateral movement of the cooler portion of the material to cause a decrease in the fluid current directed thereto to cause even movement of all portions of the material through the die.

12. A method of treating material, which comprises extruding through a die a material heated to a temperature sufficient to soften the material, directing fluid currents to portions of the material to cool the material, the cooling of one portion of the material more rapidly than the other portions causing lateral movement of the cooler portion, and utilizing lateral movement of the cooler portion of the material to cause a decrease in the fluid current directed thereto and an increase in the fluid currents to the other portions of the material to cause even movement of all portions of the material through the die.

AENEAS J. N. DUCLOS.